March 8, 1955 D. C. MILLER 2,703,717
ADJUSTABLE CREEPER HEADREST
Filed Feb. 2, 1953 2 Sheets-Sheet 1

Donald C. Miller, INVENTOR.

BY *Clarence A. O'Brien*
*and Harvey B. Jacobson*
Attorneys

March 8, 1955            D. C. MILLER            2,703,717
ADJUSTABLE CREEPER HEADREST
Filed Feb. 2, 1953            2 Sheets-Sheet 2
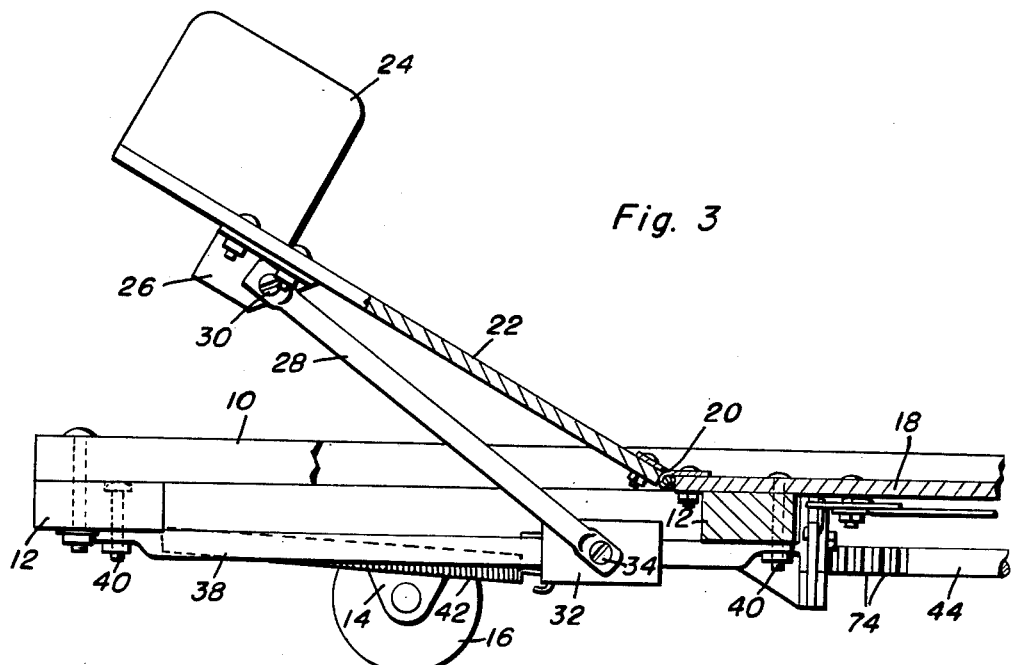
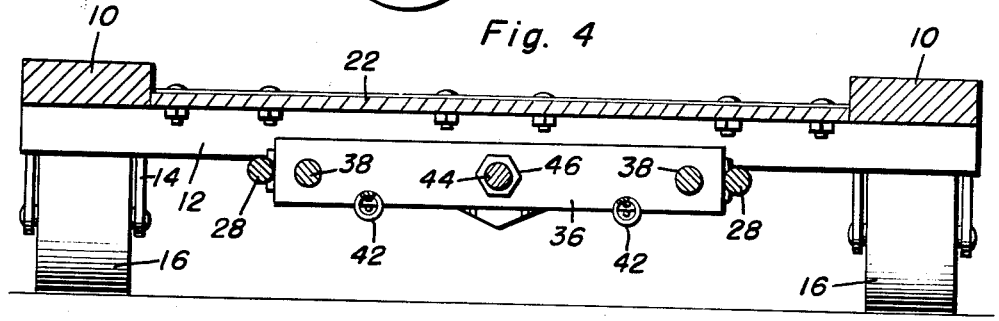
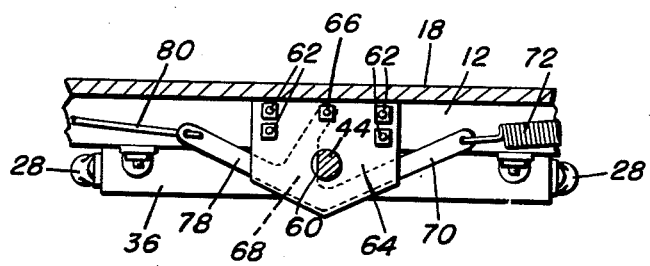
Donald C. Miller
INVENTOR.

2,703,717
ADJUSTABLE CREEPER HEADREST

Donald C. Miller, Bellevue, Ohio

Application February 2, 1953, Serial No. 334,683

2 Claims. (Cl. 280—32.6)

This invention relates to repair creepers and more particularly to a creeper having an adjustable headrest for the convenience and comfort of a user.

An object of this invention is to provide an adjustable headrest for creepers and latching means for securing the headrest in various angular positions relative to the main body of the creeper.

Another object of this invention is to provide a latching mechanism for an adjustable headrest which incorporates resilient means for normally urging the headrest to an angular position relative to the creeper.

Another object of this invention is to provide a latching mechanism which securely latches a creeper headrest in the desired position and wherein the latch release mechanism is positioned in a convenient and comfortable position for a repairman using the creeper.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 3 is an enlarged side elevation of a portion of the creeper with parts broken away and showing details of the latching mechanism;

Figure 4 is a vertical section taken substantially on the plane of section line 4—4 of Figure 2; and Figure 5 is a vertical section taken substantially on the plane of section line 5—5 of Figure 2 and showing details of the latching mechanism on an enlarged scale.

Figure 1:
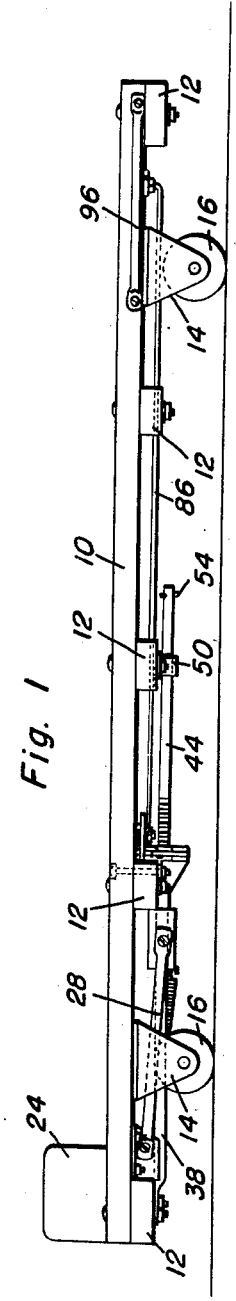
Figure 1 is a side elevation of the creeper showing the supporting bed and headrest in a horizontal position.
Figure 2:
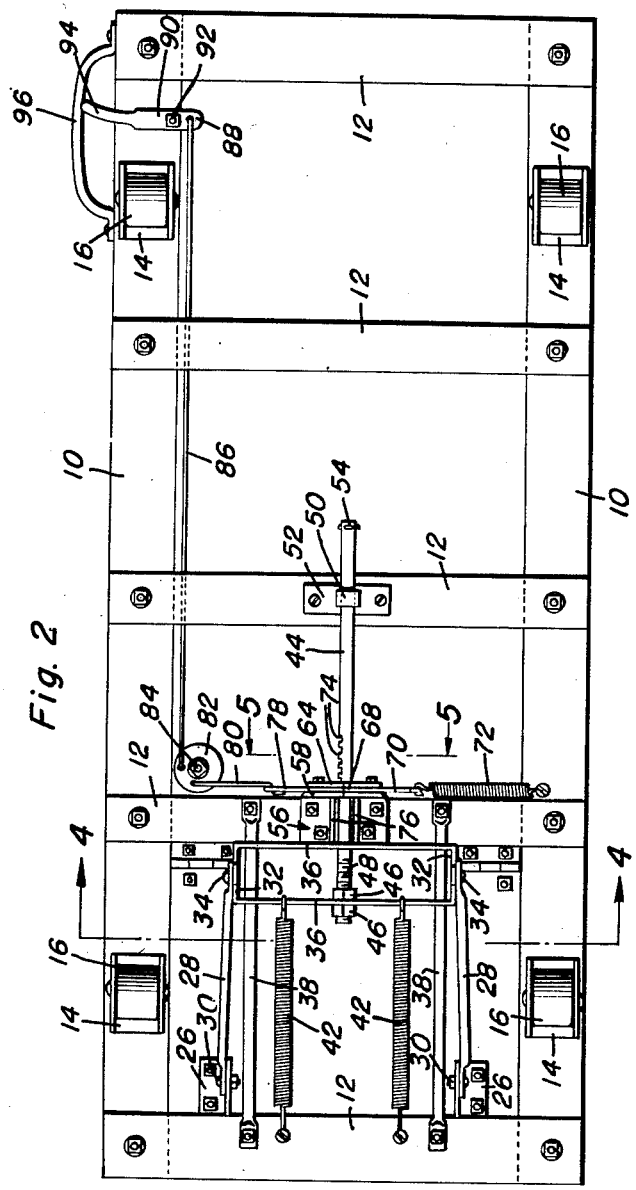
Figure 2 is a bottom view of the creeper showing details of the headrest latching means.

Referring now more particularly to Figures 1 and 2, reference numeral 10 indicates a pair of longitudinal side rails interconnected by several transverse members 12. Adjacent each corner of the creeper are depending brackets 14 secured to the side rails and pivotally supporting the ground engaging wheels 16 and by this construction, it will be readily apparent that the creeper may be rolled along the floor so that a repairman lying on the creeper may maneuver himself beneath an automobile or the like to perform repair operations thereon. In this respect, it will be noted that the wheel assemblies may be arranged and supported on the creeper in a castering fashion.

Referring more particularly to Figures 3 and 4, the transverse members 12 have a main supporting portion or bed 18 secured thereto which extends between the side rails 10 and which extends from one end of the creeper to a point spaced from the other end and a hinge 20 pivotally secures a headrest extension 22 to the bed and the extension terminates at a point at the other end of the creeper. The headrest extension carries at its free end a cushioned member 24 upon which the back of a user's head may rest during the normal course of repairs while the creeper is being used. Adjacent the free end of the extension and near each side thereof are secured a pair of brackets 26 formed of suitably shaped angles having depending webs to which one end of each of the supporting rods 28 is secured, as by the pivot bolt assembly 30. An open rectangular bracket is pivotally secured through its end wall 32 to the other end of the supporting rod by bolt 34 and the side walls 36 of the bracket are provided with apertures which slidably receive guide rods 38 which extend longitudinally of the creeper and are secured at opposite ends by bolt 40 to a pair of the transverse cross-members 12. The forward cross-member carries a pair of tension springs 42 which are secured to one of the side walls 36 and it will be readily seen that these springs normally urge the bracket assembly forwardly along the guide rods 38 so as to urge the extension 22 out of the plane of the bed 18 into angular relation therewith, such as the position shown in Figure 3.

When the headrest extension is in the same plane as bed portion 18, the supporting rod 28 is in a substantially horizontal position therebeneath but with the pivot bolt 30 spaced above the guide rods 38 so that springs 42 work through a lever arm in raising the extension and it will be readily seen that the greater the angular inclination of the extension with respect to the bed, the greater the lever arm will become. Thus, since the supporting rod 28 is acting through a substantial lever arm with respect to hinge 20, springs 42 need only be of comparatively light weight to effectively lift the extension and headrest assembly.

To prevent lifting of the headrest assembly until such time as this operation is desired and to latch the assembly in proper angular relation with respect to the bed, a latch bar 44 is secured by nut 46 engaged on its threaded end 48 to clamp therebetween one of the side walls 36, the other side wall being apertured so that the latch bar extends rearwardly therefrom and extends adjacent its other end through a boss 50 on the bearing bracket 52 secured to an intermediate cross-member 12. A cotter pin 54 may be inserted through an aperture or opening diametrically of the free end of the latching bar to prevent accidental disengagement of the bar from the boss 50.

An intermediate portion of the latching bar extends beneath another cross-member 12 which is provided with a bracket 56 having a depending flange 58 apertured, as at 60, to receive the latch bar and to which is secured, by bolts 62, another depending plate or flange which is similarly apertured to receive the latch bar. A pivot and spacing bolt 66 pivotally secures a latching dog 68 between the plates or flanges 58 and 64 and one arm 70 of the dog is connected to tension springs 72 anchored to the creeper frame and which normally urge the latching dog into engagement with the various notches 74 extending vertically in spaced relation along one side of the latch bar.

To add strength to the bracket 56 and to help properly position the latching bar 44, a pair of depending plates 76 may be secured to the bracket and to the depending flange 58 in spaced parallel relation to the latch bar. The other leg 78 of the latch dog is secured to one end of a flexible member 80, wire or the like, and the other end of the flexible member is secured adjacent a peripheral portion of the washer 82 pivotally secured to the creeper by the vertical pivot bolt 84. A second flexible member 86 is also connected to the washer and extends therefrom parallel to one of the side members 10 to the free end 88 of actuating or release lever 90 pivotally secured intermediate its ends to the side member 10 by the vertical pivot bolt 92 and which terminates at its other end in a finger portion 94 disposed outwardly of the side frame member wherein it is readily accessible to a repairman on the creeper. A guard 96 may be secured on the side frame member 10 in protective relation to the finger portion 94 so that the latch release mechanism will not be actuated accidentally by the creeper being bumped into an obstacle.

In operation, a repairman positioned on the creeper beneath an automobile or truck or the like when desirous of elevating his head from the prone position, merely raises his head and actuates the release lever which, through the flexible member and the intermediate idler crank washer 82, will disengage the latch dog from the latch bar and permit the springs 42 to urge the headrest extension upwardly to the desired position. Upon release of the release member 94, the spring 72 will return the latch dog into engagement with the latch bar so that the headrest extension will be maintained in its desired position. The release mechanism, being positioned at the lower or bottom end of the creeper, will be in a convenient and comfortable position for actuation by the repairman and will present a readily accessible mechanism. The headrest extension may be returned to its horizontal position by applying a light downward pressure thereon when the release mechanism is actuated.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly, all suitable modifications and equivalents may be resorted to, falling within the scope of the appended claims.

What is claimed as new is as follows:

1. A repair creeper comprising a wheeled frame including a pair of spaced side members, a forward cross member and a rearward cross member interconnecting opposite ends of the side members and an intermediate cross member spaced from the forward cross member, a main supporting bed extending between said intermediate and rearward cross members and secured thereto, a headrest hingedly secured to said bed at the intermediate cross member and extending therefrom to overlie the forward cross member, a pair of guide rods secured at opposite ends to the intermediate and forward cross members beneath said headrest, a pair of support rods pivotally secured at one end to the undersurface of said headrest, means on the other ends of said support rods slidably received on said guide rods, a bracket depending from said intermediate cross member, a latch bar extending rearwardly from said means through said bracket, a latch dog pivotally secured to said bracket and engaged with said bar, and means for releasing said dog.

2. The combination of claim 1 wherein said bracket includes a pair of spaced, depending flanges, said latch dog being disposed between and pivotally secured to said flanges.

References Cited in the file of this patent

UNITED STATES PATENTS

| | | |
|---|---|---|
| 1,349,941 | Broome | Aug. 17, 1920 |
| 1,581,592 | Neal | Apr. 20, 1926 |
| 2,051,563 | Mance | Aug. 18, 1936 |
| 2,564,323 | Brown | Aug. 14, 1951 |
| 2,614,271 | Neil | Oct. 21, 1952 |